(12) United States Patent
Ocke et al.

(10) Patent No.: US 8,649,042 B2
(45) Date of Patent: Feb. 11, 2014

(54) SYSTEM AND METHOD FOR AUTOMATED GENERATION OF A FULLY PARAMETERIZED WORKFLOW PLAN

(75) Inventors: Kirk J. Ocke, Ontario, NY (US); Rong Zhou, San Jose, CA (US); Minh B. Do, Palo Alto, CA (US); Dale Ellen Gaucas, Penfield, NY (US); Michael David Shepherd, Ontario, NY (US)

(73) Assignees: Xerox Corporation, Norwalk, CT (US); Palo Alto Research Center Incorporated, Palo Alto, CA (US)

( * ) Notice: Subject to any disclaimer, the term of this patent is extended or adjusted under 35 U.S.C. 154(b) by 750 days.

(21) Appl. No.: 12/508,763

(22) Filed: Jul. 24, 2009

(65) Prior Publication Data

US 2011/0019223 A1   Jan. 27, 2011

(51) Int. Cl.
*G06F 3/12*   (2006.01)

(52) U.S. Cl.
USPC ......................................... 358/1.15; 358/1.13

(58) Field of Classification Search
USPC ................................................ 358/1.1, 1.15
See application file for complete search history.

(56) References Cited

U.S. PATENT DOCUMENTS

| | | | |
|---|---|---|---|
| 6,397,192 B1 | 5/2002 | Notani et al. | |
| 7,406,357 B2 | 7/2008 | Ocke et al. | |
| 2002/0145750 A1* | 10/2002 | Honda et al. | 358/1.15 |
| 2008/0084574 A1* | 4/2008 | McDonald et al. | 358/1.15 |
| 2008/0235070 A1 | 9/2008 | Seliger | |
| 2009/0116055 A1 | 5/2009 | Ocke et al. | |

OTHER PUBLICATIONS

U.S. Appl. No. 12/323,800, filed Nov. 26, 2008, Ocke et al.

* cited by examiner

*Primary Examiner* — King Poon
*Assistant Examiner* — Iriana Cruz
(74) *Attorney, Agent, or Firm* — Luis M. Ortiz; Kermit D. Lopez; Ortiz & Lopez, PLLC

(57) ABSTRACT

An improved automated planning method and system includes the use of an automated planner for generating a plan template and a final plan generator to produce a fully parameterized workflow plan. Such an approach provides for the generation of fully parameterized workflow plans utilized in rendering environments. A plurality of device capability descriptions can be converted into a data indicative of facts and operators for use with an automated planner, which can be either domain-independent or domain-dependent. Next, a formal product description can be converted into properties indicative of a goal state. The goal state and the data indicative of facts and operators can then be utilized with the automated planner to synthesize a plan template. The plan template is then provided to a final plan generator, along with a formal product description, to produce a fully parameterized workflow plan.

17 Claims, 5 Drawing Sheets

SYSTEM AND METHOD FOR AUTOMATED GENERATION OF A FULLY PARAMETERIZED WORKFLOW PLAN

TECHNICAL FIELD

Embodiments are generally related to automated planning methods and systems. Embodiments are also related to plan templates utilized in rendering environments such as, for example, print shops. Embodiments additionally relate to techniques for automated generation of fully parameterized workflow plans utilized in printing environments.

BACKGROUND OF THE INVENTION

Rendering environments such as, for example, print shops require a variety of plan templates (or workflow plans) in order to achieve maximum efficiency and output in the production and rendering of documents, graphics, and so forth. A print shop can be a system wherein devices for formatting, printing, cutting, and binding are utilized to create a finished printed product such as a book or brochure. A "plan template" and a "workflow plan" are both essentially an ordered or partially ordered list of the actions needed to manufacture the desired finished product using the devices available. The difference between a "plan template" and a "workflow plan" is measured by the completeness of the plan. A "plan template" is typically a partial or skeleton plan and a "workflow plan" is typically a complete plan.

When "lights out" workflow automation is desired in a print shop, the automated synthesizing of a plan template within the capabilities of the devices and services of the print shop is necessary. Current device capability description languages describe what an individual device is capable of performing, but are not efficient in describing the relationships between individual devices (e.g., Imposition must come before Print for a printer that does not do on-board imposition), nor do they express adequately how the device will effect or alter the plan template. It should be noted that printing of books is performed by printing large sheets of paper which are formatted through a process called imposition, for later folding that will result in sequential pagination. One example of the inefficiency of current device capability description languages is when an imposition device that performs Booklet-Signature imposition, the imposition device may alter the input image size from, for example, 8.5×11 to 17×11. Such an effect is not often described by the capability description of the imposition device. For this reason, the current state of the art can only be effectively used to synthesize plan templates for which every effect of each step in the workflow is known "a priori" at the start of workflow execution, which is not always realistic.

Additionally, many of the constraints and capabilities of a device are not often contained in a formal capability description file, but are instead only available from other sources (e.g., queue settings, implicit knowledge, etc.). There are also a variety of device capability description languages which can further complicate how individual devices communicate. Some languages describe or relate to the capabilities of a printer. Another common device capability description language is Job Definition Format (JDF) which describes the capabilities of a wide range of devices found in the print shop. All of these factors make it difficult to accurately automatically synthesize a plan template in a print shop.

Plan templates can be generated utilizing a number of different approaches. For example, plan templates can be automatically generated using technology that converts a product description into a plan template. Plan templates can also be manually created as part of the order entry process and planning process within a print shop. Finally, a plan template may be supplied by an external entity, such as when a print shop receives work that has been vended out from another print shop.

Also of importance in "lights out" automation of a printing environment is a reliable means of generating a fully parameterized workflow plan. A plan template describes only at a high-level the workflow to be executed. It typically describes the desired press-sheet (Media) size, the nodes in the workflow (e.g., impose followed by print), the relationships between them (e.g., ordering), and high-level parameterization (e.g., requires multi-up Imposition). On the other hand, a completely parameterized workflow plan describes everything contained in a plan template, but also includes all of the necessary details: such as all the details of the Media (color, opacity, etc.), detailed parameterization of the process nodes (e.g., 5×2 multi-up grid Imposition centered on an 8.5×11 surface), descriptive information (e.g., customer contacts), quality of service information (e.g., required delivery/completion date), document content files (e.g., PDF files), and many other details.

Generating a plan template and a completely parameterized workflow plan are often accomplished as a single step, or the plan template is specified in a static way and used during the parameterization step. If these two aspects of generating a workflow plan are separated, then different techniques can be used to solve each aspect. It is believed that a system is needed that is capable of generating a plan template separate from a fully parameterized workflow plan. It is also believed that there exists a need for a way to dynamically generate plan templates such that they would be consistent with the current state and preferences of an arbitrary print shop. Such dynamic plan templates would allow an automated workflow plan generation system to adapt to the current state of the print shop in a more seamless manner.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved automated final plan generator method and system.

It is another aspect of the present invention to provide for an improved method and system for implementing and managing plan templates utilized in printing environments such as, for example, print shops.

It is a further aspect of the present invention to provide for an improved method and system for automatically synthesizing a plan template to be utilized in print environments.

It is another aspect of the present invention to provide for an improved technique for converting device capability languages for use in an automated planning environment.

It is an additional aspect of the present invention to provide for an improved method and system for generating a fully parameterized workflow plan using a final plan generator.

The aforementioned aspects and other objectives and advantages can now be achieved as described herein. A method and system are disclosed for automated generation of a fully parameterized workflow plan. A plurality of device capability descriptions can be converted into data indicative of facts and operators for utilization in a knowledge-based reasoning system. Next, a formal product description can be converted into properties indicative of a goal state. The goal state and the data indicative of facts and operators can then be utilized in association with a domain-independent or domain-dependent planner to synthesize a plan template. The plan template can then be provided, along with the formal product description, to a final plan generator to produce a fully parameterized workflow plan. The final plan generator functions to completely parameterize all of the processing steps specified in the plan template either with or without the assistance of a rule-based system.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The disclosed embodiments relate to techniques for automatically converting a plurality of device capability descriptions into facts, predicates, and/or operators in an automated planning system, along with an approach for converting a specific formal product description into the desired properties of a goal state, in the same automated planning system. Additional knowledge from sources beyond the device capability descriptions may also be encoded within the context of the automated planning system. This knowledge represents the relationships between devices and the effects of devices not captured in the device capability descriptions. The automated planning method and system can then be utilized to synthesize a plan template using the desired properties of the goal state. A fully parameterized workflow plan can then be generated by providing the plan template, along with the formal product description, to an automated final plan generator which completely parameterizes all of the processing steps specified by the plan template by utilizing a rule-based expert system.

The disclosed embodiments can be easily implemented utilizing a backwards chaining rule-based system and can be accomplished utilizing an automated planning system. For the sake of simplicity, however, the embodiments discussed herein focus primarily on an automated planning system.

Figure 1:
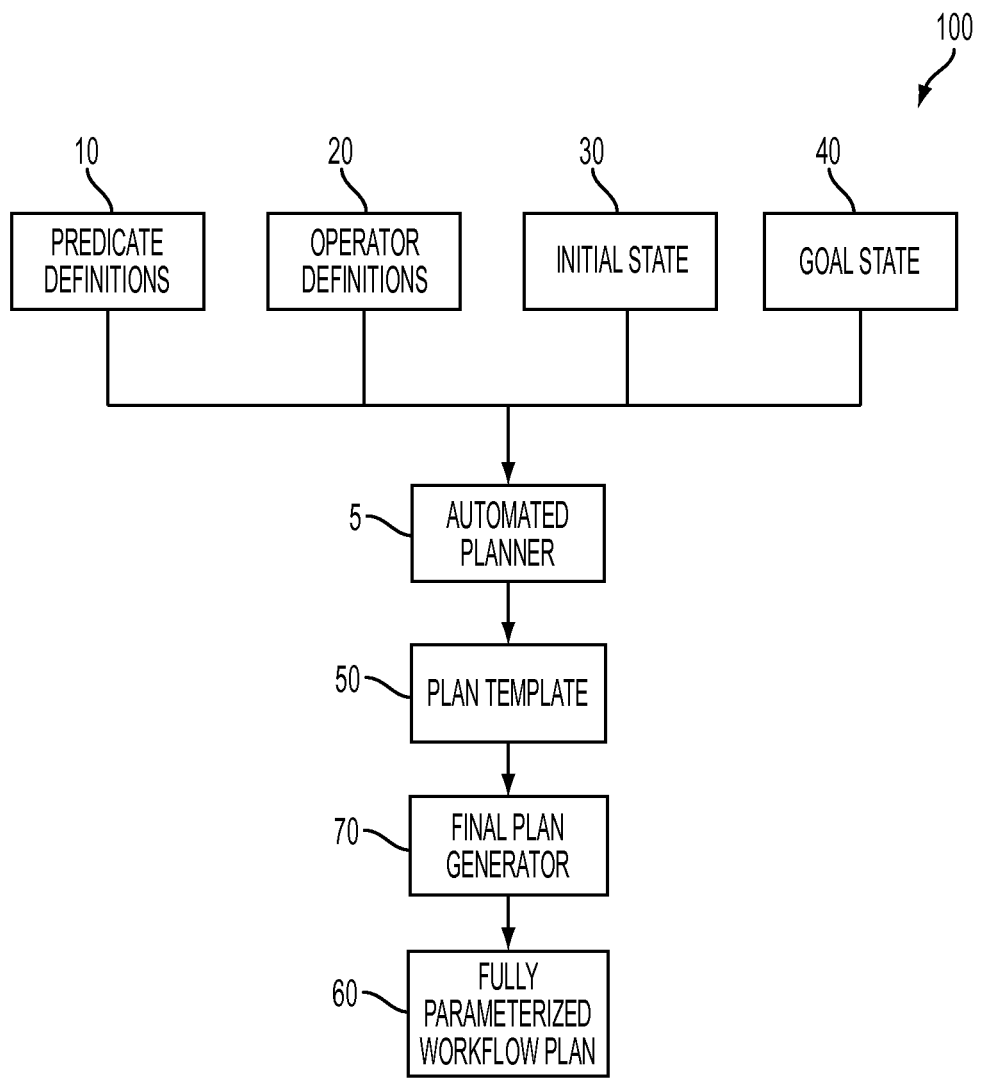
FIG. 1 illustrates an automated planning system, including a final plan generator, that can be implemented in accordance with a preferred embodiment.

FIG. 1 illustrates an automated planning system 100 that can be implemented, in accordance with a preferred embodiment. It can be appreciated that the automated planning system 100 may be implemented in the context of, for example, a data-processing apparatus and/or system.

As depicted in FIG. 1, an automated planner 5 receives as input, a set of predicate definitions 10 which can be utilized to describe the "state of the world". The automated planner 5 can also receive a set of operator definitions 20 that are capable of modifying the "state of the world". The automated planner 5 can also receive as input, an initial-state 30 of the world defined by the initial facts (e.g., grounded predicates) in the system 100 and a description of the desired properties of a goal-state 40. Properties of a goal-state 40 can include a description of the physical properties of a finished product, required processing steps (e.g. Imposition, Printing, Format Conversion, etc.), required resources (e.g. required press-sheet size), and required devices. Given such inputs, the automated planner 5 can then determine a sequence of actions (i.e., a plan template 50) that lead from the initial-state 30 to the goal-state 40. The automated planner 5 generally functions by performing an algorithmic search through a large space of possibilities looking for at least one plan template 50 that satisfies the desired goal-state 40. The resulting plan template 50 can be dynamically generated based on the state of the print shop.

In the automated planning system 100 illustrated in FIG. 1, the set of predicate definitions 10 and the set of operator definitions 20 are products of modeling the domain for which automated planning will occur and are known as the domain model. Domain modeling can be performed utilizing a processor (not shown) and a planning language such as Planning Domain Definition Language (PDDL). These definitions 10 and 20 represent what is known about the domain and cannot be automatically generated in a domain independent way. The initial predicate definitions 10 and operator definitions 20 are arrived at as a result of knowledge engineering and domain modeling and are reusable across arbitrary print shops. As such the predicate and operator definitions 10 and 20 are known "a priori" to the automated planning system 100 at the time plan template 50 generation occurs. The initial-state 30 and the properties of the goal-state 40, however, can be automatically generated since the domain model is already well known.

The plan template 50 can be then provided to the final plan generator 70 which utilizes a rule-based expert system to produce a fully parameterized workflow plan 60. The fully parameterized workflow plan 60 can include expanded details regarding parameters of the desired final product such as, the color and opacity of the media to be used, detailed parameterization of the process nodes, descriptive information including customer contacts, required completion and delivery dates, document content files, and many other such details.

Figure 2:
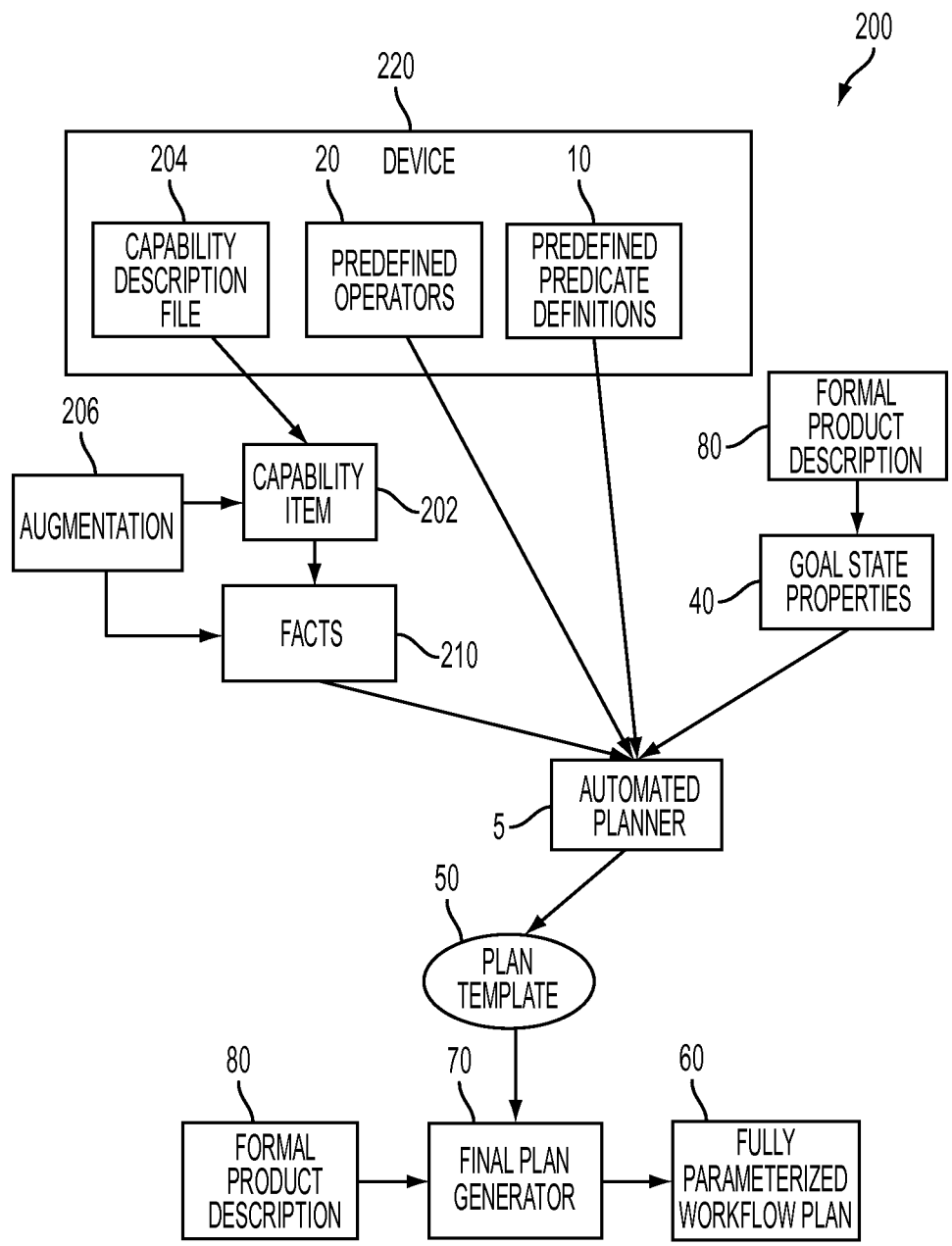
FIG. 2 illustrates a method for automatically synthesizing a plan template using an automated planning system where the plan template is then fully parameterized in accordance with a preferred embodiment.

FIG. 2 illustrates a method 200 for automatically synthesizing a plan template 50 using the automated planning system 100 depicted in FIG. 1, in accordance with a preferred embodiment. Note that in FIGS. 1-3, identical or similar parts or elements are indicated by identical reference numerals. Thus, for example, the automated planner 5 depicted in FIG. 2 represents the same device/component illustrated in FIG. 1.

Initially, each individual device capability/constraint of interest (i.e., capability item 202) may be read from the capability description file 204. If applicable, the capability item 202 can be augmented with information available from sources external to the capability description file 204. To support both functions of the automated planning system 100, the domain description files should be augmented by meta-level information that is relevant to plan template synthesis. For example, when a print action is taken, not only the physical effects of a print action need to be modeled, but also that a certain printer is to be used to print a given job, because such information may be required later when generating a fully parameterized workflow plan.

The potentially augmented capability item 202 is then transformed into one or more facts 210 for use in the automated planning system 100. Based on the type of device 220 (e.g., printer, binder, etc) described by the capability description file 204, one or more predicate definitions and operators 10 and 20 are added to the automated planner 5 from the pre-defined set of "a priori" known operators and predicate definitions 10 and 20. Additional facts, predicates, and operators may be added to the knowledge base and/or may be used while transforming the capability item into facts 210. Augmenting 206 the capability item 202 may be necessary when the capability description file 204 inadequately describes the capabilities of the device 220 or service, or when information about the relationships between devices and services is not available in the capability description file 204.

Potential sources of additional information are: MIB information obtained using SNMP that describes the current state of the device; "a priori" or site specific operators that describe known effects of a device has on a workflow plan as a result of execution of the device (e.g., a rule may describe that Imposition devices double the width of the image size when performing Booklet-Signature imposition); "a priori" or site specific operators that describe known constraints of a device that are not captured in the capability description file (e.g., a rule describing that no binding can have been applied prior to use of a Saddle Stitching device); "a priori" or site specific preferences (e.g., a print shop may decide to make a particular device available or unavailable for use during certain times); as devices and services are added, removed, or become unavailable, and/or have their configuration changed, the delta between the capability items and the facts in the automated planning system is determined and the facts in the automated planning system are updated accordingly.

As depicted in FIG. 2, the automated planner 5 utilizes as input, the facts 210, the predicated definitions and operators 10 and 20, and the goal state properties 40 in order to synthesize the plan template 50. The plan template 50 can then be provided to the final plan generator 70, along with a formal product description 80, in order to produce a fully parameterized workflow plan 60. The formal product description 80 can include, but is not limited to, the finished dimensions, the unfolded dimensions, required folding, required binding, number of pages, etc.

Figure 3:
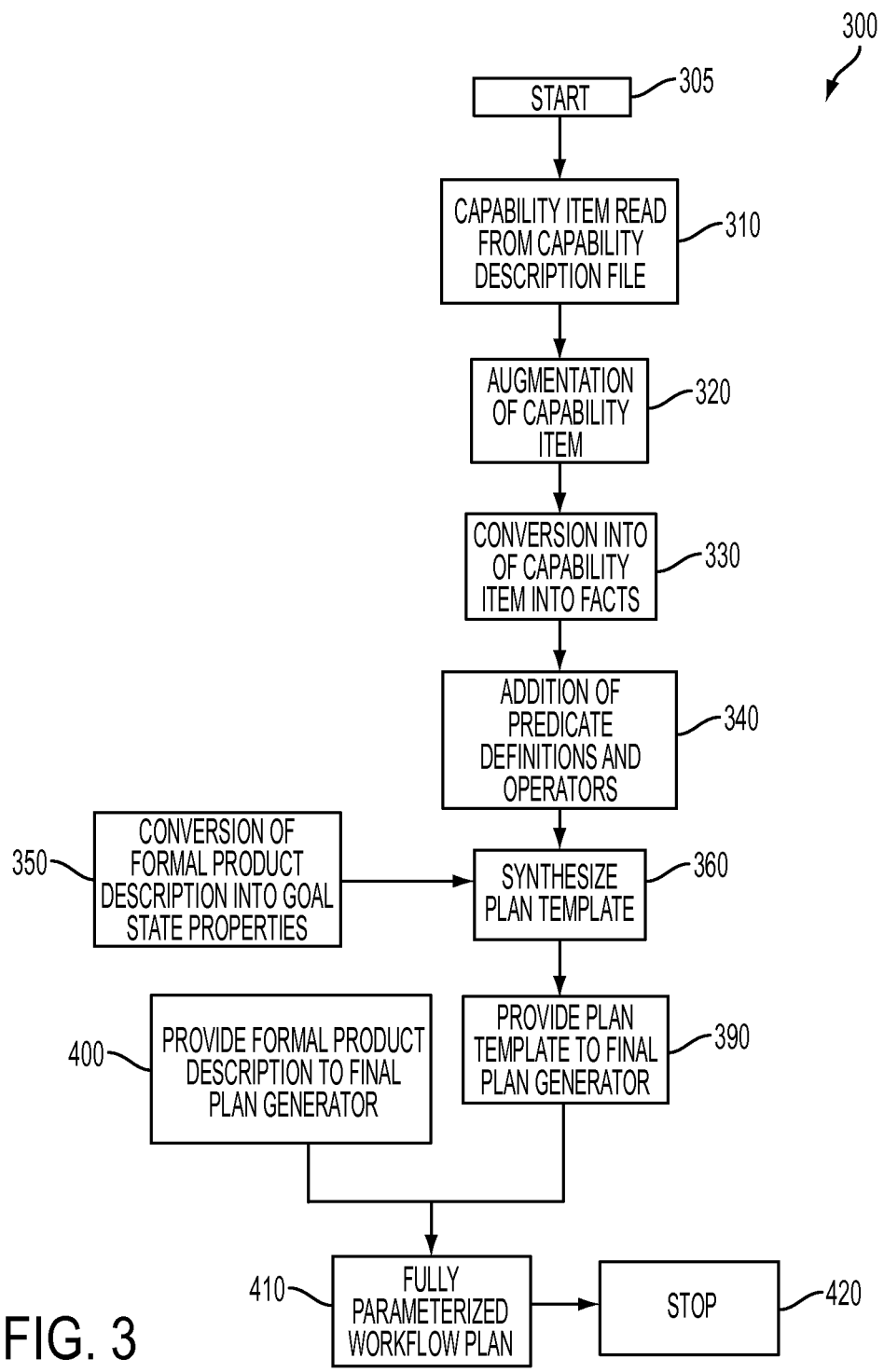
FIG. 3 illustrates a detailed flow chart of operations illustrating logical operational steps of the method for automatically synthesizing a plan template and fully parameterizing the plan template utilizing the automated planning system of FIGS. 1-2, in accordance with a preferred embodiment.

FIG. 3 illustrates a detailed flow chart of operations illustrating logical operational steps of a method 300 for automatically synthesizing a plan template 50 and generating a fully parameterized workflow plan 60 utilizing the automated planning system 100 depicted in FIG. 1, in accordance with a preferred embodiment. The method 300 can be implemented in the context of a computer-usable medium that contains a program product.

The process begins, as indicated at block 305. Initially, each individual device capability/constraint of interest (i.e., capability item 202) can be read from the capability description file 204, as depicted in block 310. If applicable, the capability item 202 can be augmented with information available from sources outside the capability description file 204, as depicted in block 320. The operation illustrated thereafter at block 330 indicates that the potentially augmented capability item 202 can then be transformed into one or more facts 210 for use in the automated planning system 100. Next, additional facts, predicates, and operators may be added to the knowledge base, and/or may be utilized, while transforming the capability item into facts 210, as shown in block 340. Additionally, as depicted in block 350, a formal product description 80 is converted into goal state properties 40. The automated planner 5 then utilizes these facts 210 and goal state properties 40 as input for synthesizing a plan template 50, as depicted in block 360.

Further illustrated in FIG. 3 is providing the executable plan template 50 to the final plan generator 70, as depicted in block 390. As described in block 400, a formal product description 80 is also provided to the final plan generator 70. The final plan generator 70 then produces a fully parameterized workflow plan 60, as shown in block 410. The process of method 300 can then terminate, as indicated at block 420, following processing of the operation depicted at block 410.

Figure 4:
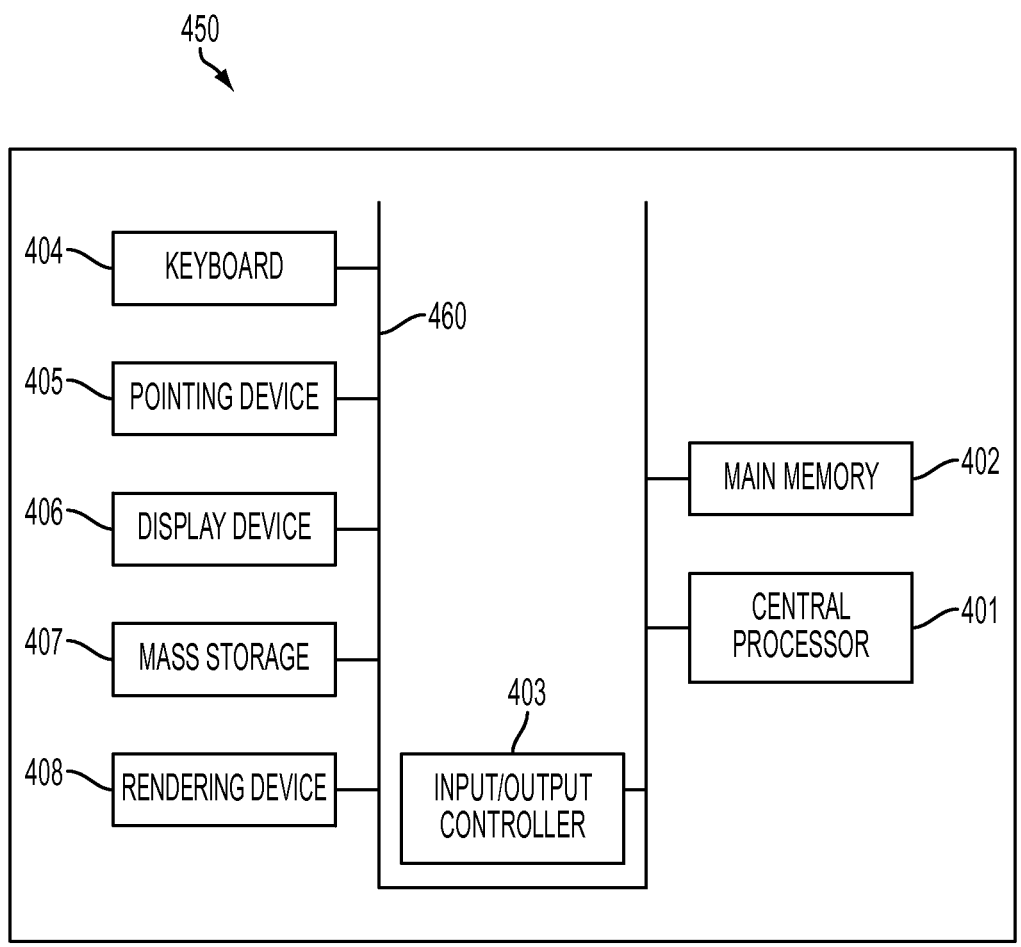
FIG. 4 illustrates a schematic view of a data-processing system in which the present invention may be embodied.

As depicted in FIG. 4, labeled "Prior Art", the present invention may be embodied in the context of a data-processing apparatus 450 comprising a central processor 401, a main memory 402, an input/output controller 403, a keyboard 404, a pointing device 405 (e.g., mouse, track ball, pen device, or the like), a display device 406, and a mass storage 407 (e.g., hard disk). Additional input/output devices, such as a rendering device 408, may be included in the data-processing apparatus 450 as desired. Note that the rendering device 408 may constitute, for example, a printer, a copier, scanner, and/or other types of rendering components, depending upon design considerations. As illustrated, the various components of the data-processing apparatus 400 communicate through a system bus 460 or similar architecture.

Programs defining functions on the present invention can be delivered to a data-processing apparatus 450 via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Furthermore, it is understood that the embodiments may be implemented by a system having means in the form of hardware, software, or a combination of software and hardware as described herein or their equivalent. System 100 can also be implemented in the context of such a system having hardware, software, etc. Thus, the method 300 and/or system 100 described herein can be deployed as process software in the context of a computer system and/or data-processing system such as that depicted in FIG. 4. The method 300 generally constitutes instructions that can be processed by a processor of a data-processing apparatus 450 for performing a particular task. Additionally, it can be appreciated that each or all of the components depicted in FIG. 1 such as, for example, the automated planner 5, the plan template 50, the final plan generator 70, and the workflow plan 60, may be software programs containing instructions that when carried out by a processor of a data-processing apparatus 450 or computer system, perform the respective functionalities of such components, as described herein.

Figure 5:
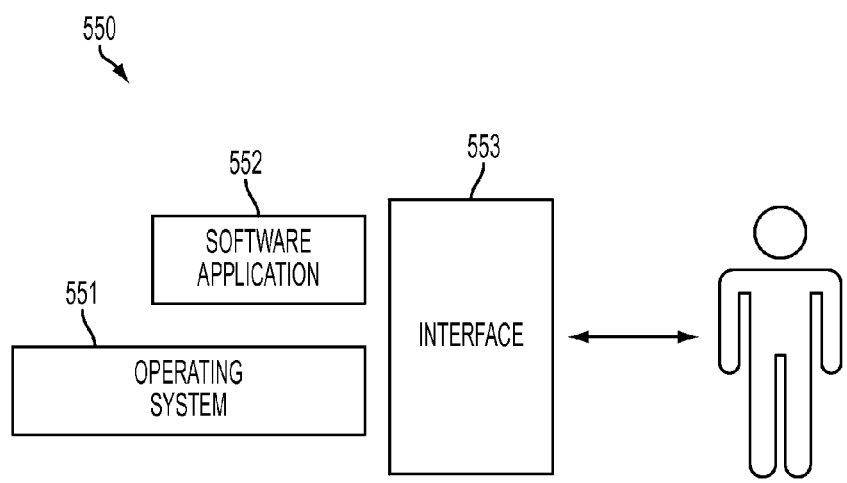
FIG. 5 illustrates a schematic view of a software system including an operating system, application software, and a user interface for carrying out the present invention.

FIG. 5, labeled "Prior Art", illustrates a computer software system 550 for directing the operation of the data-processing apparatus 450 depicted in FIG. 4. Software system 550, which is stored in system memory 402 and on disk memory 407, can include a kernel or operating system 551 and a shell or interface 553. One or more application programs, such as application software 552, may be "loaded" (i.e., transferred from storage 407 into memory 402) for execution by the data-processing apparatus 450. The data-processing apparatus 450 receives user commands and data through user interface 553; these inputs may then be acted upon by the data-processing apparatus 450 in accordance with instructions from operating module 551 and/or application module 552.

The interface 553, which is preferably a graphical user interface (GUI), also serves to display results, whereupon the user may supply additional inputs or terminate a given session. In one possible embodiment, operating system 551 and interface 553 can be implemented in the context of a "Windows" system. It can be appreciated, of course, that other types of systems are possible. For example, rather than a traditional "Windows" system, other operation systems such as, for example, Linux may also be employed with respect to operating system 551 and interface 553. Application module 552, on the other hand, can include instructions such as the various operations described herein with respect to the various components and modules described herein such as, for example, the method 300 depicted in FIG. 3.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system/apparatus including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for automated generation of a fully parameterized workflow plan, comprising:
   reading a capability item, wherein said capability item comprises at least one device capability or constraint of interest;
   augmenting said capability item with meta-level information, wherein said meta-level information is relevant to synthesizing a plan template, wherein said meta-level information comprises a site-specific operator;
   generating said plan template utilizing said capability item and properties of a goal-state, a priori operators and data indicative of facts defined over a set of predicates in association with an automated planner; and
   transmitting said plan template and said formal product description to a final plan generator, wherein said final plan generator parameterizes all processing steps specified by said plan template and produces said fully parameterized workflow plan comprising detailed parameterization of a plurality of process nodes and descriptive information, said descriptive information comprising at least one of: customer contacts, required completion, delivery dates, and document content files.

2. The method of claim 1 further comprising converting a plurality of device capability descriptions into said data indicative of facts defined over a set of predicates and operators for utilization with said automated planner.

3. The method of claim 2 further comprising converting a formal product description into said properties of a goal-state for utilization with said automated planner.

4. The method of claim 3 further comprising converting an initial state into facts for utilization in said automated planner.

5. The method of claim 1 further comprising predetermined predicate definitions and operators utilizing a domain modeling approach.

6. The method of claim 2 further comprising converting said device capability descriptions into individual capability items.

7. The method of claim 3 wherein said properties of a goal state include at least one of: a description of the physical properties of a finished product, required processing steps, required resources, and required devices.

8. A system for automated generation of a fully parameterized workflow plan, comprising:
   a capability item that is read, wherein said capability item comprises at least one device capability or constraint of interest;
   meta-level information that augments said capability item, wherein said meta-level information is relevant to synthesizing a plan template, wherein said meta-level information comprises a site-specific operator;
   an automated planner utilizing properties of a goal-state, predicate definitions and a priori operators, and data indicative of facts that generates said plan template; and
   a final plan generator that receives as input, said plan template and said formal product description producing said fully parameterized workflow plan comprising detailed parameterization of a plurality of process nodes and descriptive information, said descriptive information comprising at least one of: customer contacts, required completion, delivery dates, and document content files.

9. The system of claim 8 wherein a plurality of device capability descriptions are converted into data indicative of facts and operators for utilization with said automated planner.

10. The system of claim 8 wherein said plan template is converted into properties of a goal-state for utilization with said automated planner.

11. The system of claim 10 wherein said properties of a goal state include at least one of: a description of the physical properties of a finished product, required processing steps, required resources, and required devices.

12. A non-transitory computer program product for use with a computer, said computer program product comprising a computer usable medium for automated generation of a fully parameterized workflow plan, said computer-usable medium embodying computer program code, said computer program code comprising program instructions executable by a processor, said program instructions comprising:
   program instructions to read a capability item, wherein said capability item comprises at least one device capability or constraint of interest;
   program instructions to au ent said capability item with meta-level information, wherein said meta-level information is relevant to synthesizing a plan template, wherein said meta-level information comprises a site-specific operator;

program instructions to generate said plan template utilizing properties of a goal-state, a priori operators and data indicative of facts defined over a set of predicates, in association with said automated planner; and program instructions to transmit said plan template and said formal product description to a final plan generator producing said fully parameterized workflow plan comprising detailed parameterization of a plurality of process nodes and descriptive information, said descriptive information comprising at least one of: customer contacts, required completion, delivery dates, and document content files.

13. The non-transitory computer program product of claim 12, wherein said program instructions further comprise program instructions to convert plurality of device capability descriptions into said data indicative of facts defined over a set of predicates and operators for utilization with said automated planner.

14. The non-transitory computer program product of claim 12, wherein said program instructions further comprise program instructions to convert a formal product description into properties of a said goal-state for utilization with said automated planner.

15. The non-transitory computer program product of claim 12, wherein said program instructions further comprise program instructions to convert an initial state into said facts for utilization in said automated planner.

16. The non-transitory computer program product of claim 12, wherein said program instructions further comprise program instructions to convert said device capability descriptions into individual capability items.

17. The non-transitory computer program product of claim 12, wherein said program instructions further comprise program instructions to predetermine said data indicative of facts defined over a set of predicates utilizing a domain modeling approach.

* * * * *